United States Patent
Seol et al.

(10) Patent No.: US 11,597,225 B2
(45) Date of Patent: Mar. 7, 2023

(54) SILVER INK FOR 3D PRINTING AND 3D PRINTING METHOD USING SAME

(71) Applicant: KOREA ELECTROTECHNOLOGY RESEARCH INSTITUTE, Changwon (KR)

(72) Inventors: Seung Kwon Seol, Namyangju (KR); Sang Hyeon Lee, Gangneung (KR); Won Suk Chang, Seoul (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 512 days.

(21) Appl. No.: 16/608,598

(22) PCT Filed: Apr. 26, 2018

(86) PCT No.: PCT/KR2018/004848
§ 371 (c)(1),
(2) Date: Mar. 12, 2020

(87) PCT Pub. No.: WO2018/199644
PCT Pub. Date: Nov. 1, 2018

(65) Prior Publication Data
US 2020/0207132 A1    Jul. 2, 2020

(30) Foreign Application Priority Data
Apr. 28, 2017  (KR) .......................... 10-2017-0055237

(51) Int. Cl.
B41M 1/26        (2006.01)
C08K 3/08        (2006.01)
(Continued)

(52) U.S. Cl.
CPC ................ B41M 1/26 (2013.01); C08K 3/08 (2013.01); C08K 5/05 (2013.01); C08K 5/06 (2013.01);
(Continued)

(58) Field of Classification Search
CPC ... B41M 1/26; C08K 3/08; C08K 5/05; C08K 5/06; C08K 2003/0806; C08L 1/02;
(Continued)

(56) References Cited

U.S. PATENT DOCUMENTS 7,922,939 B2    4/2011  Lewis et al.
2009/0176193 A1*  7/2009  Kaigler, Sr. .......... A61C 8/0006
                                                    433/199.1
(Continued)

FOREIGN PATENT DOCUMENTS

CN    105538720 A    5/2016
JP    2007039718 A   2/2007
(Continued)

*Primary Examiner* — David H Banh

(57) ABSTRACT

The present invention relates to silver ink for printing a three dimensional microstructure and a 3D printing method using the same. The present invention provides a method for printing a 3-dimensional silver structure pattern, the method including: a step of providing a nozzle with liquid ink including capped silver nanoparticles and exhibiting Newtonian fluid behavior; a step of forming, at a predetermined point on a substrate, a meniscus of the liquid ink with ink extruded from the nozzle; a step of allowing the ink of the nozzle to be extruded by means of the surface tension of the meniscus while moving the nozzle along a path in a direction perpendicular to the substrate, in a direction parallel to the substrate, or according to a combination of said directions; and a step of forming a silver structure pattern corresponding to the movement path of the nozzle by evaporating a solvent from the extruded ink from the region closer to the substrate. The present invention can provide a 3D printing (Continued)

method based on direct ink printing that is suitable for application to 3D printing electronic technology.

12 Claims, 11 Drawing Sheets

(51) Int. Cl.

| | |
|---|---|
| *C08L 1/02* | (2006.01) |
| *C08L 31/04* | (2006.01) |
| *C08L 33/06* | (2006.01) |
| *C08L 39/06* | (2006.01) |
| *C08L 71/02* | (2006.01) |
| *C09D 11/033* | (2014.01) |
| *C09D 11/037* | (2014.01) |
| *C09D 11/102* | (2014.01) |
| *C09D 11/107* | (2014.01) |
| *C08K 5/05* | (2006.01) |
| *C08K 5/06* | (2006.01) |
| *B33Y 70/00* | (2020.01) |
| *B33Y 80/00* | (2015.01) |

(52) U.S. Cl.
CPC ............... *C08L 1/02* (2013.01); *C08L 31/04* (2013.01); *C08L 33/064* (2013.01); *C08L 39/06* (2013.01); *C08L 71/02* (2013.01); *C09D 11/033* (2013.01); *C09D 11/037* (2013.01); *C09D 11/102* (2013.01); *C09D 11/107* (2013.01); *B33Y 70/00* (2014.12); *B33Y 80/00* (2014.12); *C08K 2003/0806* (2013.01)

(58) Field of Classification Search
CPC ........ C08L 31/04; C08L 33/064; C08L 39/06; C08L 71/02; C09D 11/033; C09D 11/037; C09D 11/102; C09D 11/107; B33Y 70/00; B33Y 80/00
See application file for complete search history.

(56) References Cited

U.S. PATENT DOCUMENTS

| | | | |
|---|---|---|---|
| 2010/0084599 | A1* | 4/2010 | Lewis ................. C09D 17/006 |
| | | | 252/62.2 |
| 2011/0039078 | A1* | 2/2011 | Brennan Fournet .. B22F 1/0545 |
| | | | 106/31.13 |
| 2011/0050803 | A1 | 3/2011 | Wu et al. |
| 2012/0105528 | A1* | 5/2012 | Alleyne ............... B41J 2/04576 |
| | | | 347/14 |
| 2015/0328835 | A1 | 11/2015 | Wu et al. |
| 2018/0208785 | A1* | 7/2018 | Chopra ................. B29C 64/112 |
| 2018/0264731 | A1* | 9/2018 | Kritchman ........... B29C 64/245 |
| 2018/0272427 | A1* | 9/2018 | Erickson ................. C23C 24/08 |
| 2018/0272601 | A1* | 9/2018 | Erickson ................. B33Y 80/00 |

FOREIGN PATENT DOCUMENTS

| | | |
|---|---|---|
| JP | 2011051341 A | 3/2011 |
| JP | 2015218395 A | 12/2015 |
| KR | 10-1380872 B1 | 4/2014 |
| KR | 1020160056485 A | 5/2016 |
| WO | 2014085725 A1 | 6/2014 |
| WO | WO2014209994 A2 | 12/2014 |
| WO | WO2016076563 A1 | 5/2016 |

* cited by examiner

FIG. 6
(a)
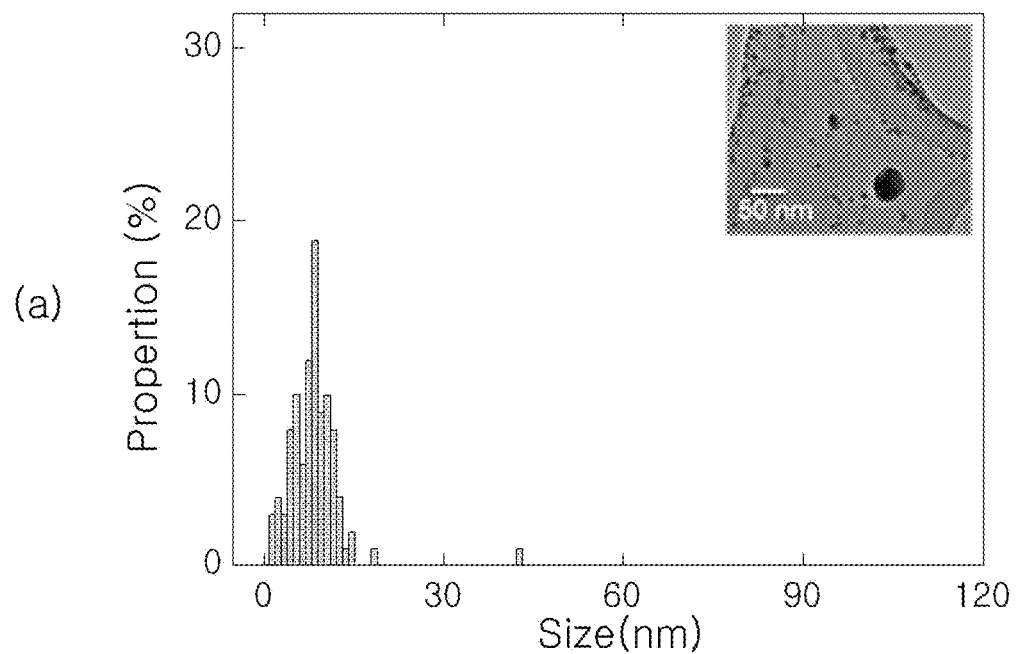
(b)
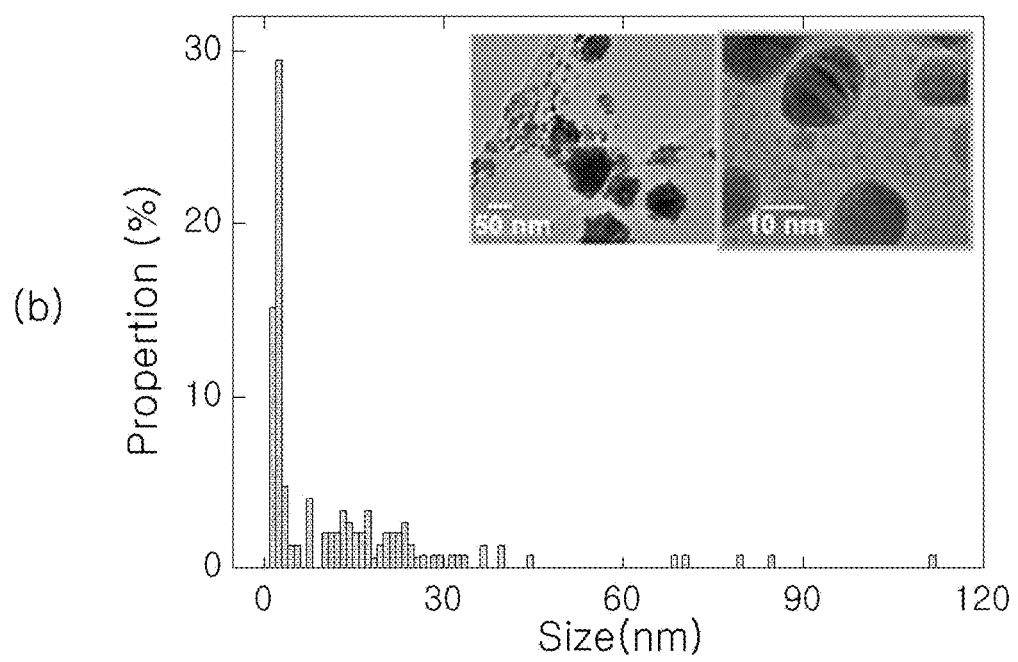

SILVER INK FOR 3D PRINTING AND 3D PRINTING METHOD USING SAME

TECHNICAL FIELD

The present invention relates to a method of printing a three-dimensional (3D) microstructure, and more particularly, to silver ink for printing a 3D microstructure and a 3D printing method using the same.

BACKGROUND ART

A printed electronic technology has an advantage in that a desired shape is directly printed, so that a cheap circuit device may be rapidly manufactured on various substrates with a simple process, compared to the existing complex and high-cost photolithography.

In general, the printed electronic technology manufactures an electronic device by scanning, copying, and outputting a plane a two-dimensional (2D) object, the electric and electronic circuits tend to be more integrated with smaller devices on a flexible substrate. However, 2D high integration has already encountered physical and technical limitations, and in order to further improve the degree of integration, it is required to manufacture three-dimensional (3D) electric and electronic devices and circuits.

In relation to this, the existing 3D printing technology has an advantage in that it is possible to shape materials, such as an insulator including rubber, nylon, and plastic, metal, and metal including stainless steel, titanium, and silver, to a real-sized model, a prototype, a tool, a component, and the like based on 3D design data by an additive manufacturing method. However, the existing 3D printing technology, such as Fused Deposit Modelling (FDM), and Selective Laser Printing (SLS), has a limit to be applied to the printed electronic technology, in which a fine pattern needs to be implemented with various functional materials, due to process elements arising from a manufacturing method or a limit of a used raw material.

Recently, there is a growing interest in 3D printed electronics technology which combines a 3D printing method and a printed electronics technology. In the past, the printed electronics technology was limitedly applied to some regions, such as a circuit of a printed circuit board, a photomask of a semiconductor, and a color filter of a display, but has an expanded application range aimed at manufacturing a complete electronic product, as well as a 3D circuit element, only by 3D printing.

In order to implement the 3D printed electronics technology, there is a need for a technology for forming a 3D structure from various functional materials having conductivity or magnetism, and also development of ink and printing technique suitable for 3D printing.

U.S. Pat. No. 7,922,939 of Lewis et al., discloses silver ink including a short-chain capping agent adsorbed on the Ag particles and having a molecular weight of 10,000 or less, and a long-chain capping agent having a molecular weight of 25,000 or more. In the patent, the ink exhibits shear thinning representing a decrease in viscosity according to an increase in a shearing speed. Accordingly, in the patent, a 3D microstructure is formed by direct ink writing by using pressure extrusion.

However, the direct ink writing in the related art requires pressurization for discharging ink, and the ink is spread during the pressurization, so that there is a limit in resolution of a line width of a pattern.

DISCLOSURE

Technical Problem

In order to solve the problems in the related art, an object of the present invention is to provide a three-dimensional (3D) printing method based on direct ink writing appropriate to the application to 3D printed electronics technology.

Another object of the present invention is to provide a 3D printing method for manufacturing a silver (Ag) pattern having high electrical conductivity.

Another object of the present invention is to provide a 3D printing method for providing a silver pattern having high resolution.

Another object of the present invention is to provide silver ink for 3D printing appropriate to the foregoing 3D printing method.

Technical Solution

In order to achieve the technical problems, the present invention provides a method of printing a three-dimensional (3D) silver structure pattern, the method including: providing a nozzle with liquid ink including capped silver nanoparticles and exhibiting Newtonian fluid behavior; forming, at a predetermined point on a substrate, a meniscus of the liquid ink with ink extruded from the nozzle; allowing the ink of the nozzle to be extruded by means of surface tension of the meniscus while moving the nozzle along a path in a direction vertical to the substrate, in a direction parallel to the substrate, or according to a combination of the directions; and forming a silver structure pattern corresponding to the movement path of the nozzle by evaporating a solvent in the extruded ink from the region closer to the substrate.

In the present invention, a concentration of the silver nano particles may be 5 to 35 wt %.

In the present invention, a line width of the pattern may be controlled by a movement speed of the nozzle.

In the present invention, the ink may include a minimum of one kind of polymer selected from the group consisting of poly acrylic acid (PAA), carboxylmethyl cellulose, polyvinylpyrrolidone (PVP), alkyl amine, polyethylene glycol (PEG), and polyvinyl alcohol (PVA) as a capping agent. In this case, the capping agent may have molecular weight of 50,000 or more.

Further, in the present invention, in the ink, a cumulative distribution of the silver particles of which grain size is 30 nm or more may be 10% or more, and an average grain size of the ink may be less than 15 nm.

Further, in order to achieve another technical problem, the present invention provides silver ink for three-dimensional (3D) printing, including: a minimum of one kind of polar solvent selected from the group consisting of water, alcohol, and acetone; and silver particles dispersed in the solvent, and including SH, COOH, or NH functional groups adsorbed to surfaces, in which a concentration of the silver particles is 15 to 35 wt %, and the silver particles exhibit Newtonian fluid behavior. In the present invention, viscosity of the ink may be 2 mPa·s to 100 mPa·s, and viscosity of the ink may be 5 mPa·s to 20 mPa·s.

Advantageous Effects

According to the present invention, it is possible to provide the three-dimensional (3D) printing method based on direct ink writing appropriate to be applied to 3D printed electronics technology. Further, according to the present invention, it is possible to manufacture a silver pattern having high electrical conductivity and resolution.

Figure 2:
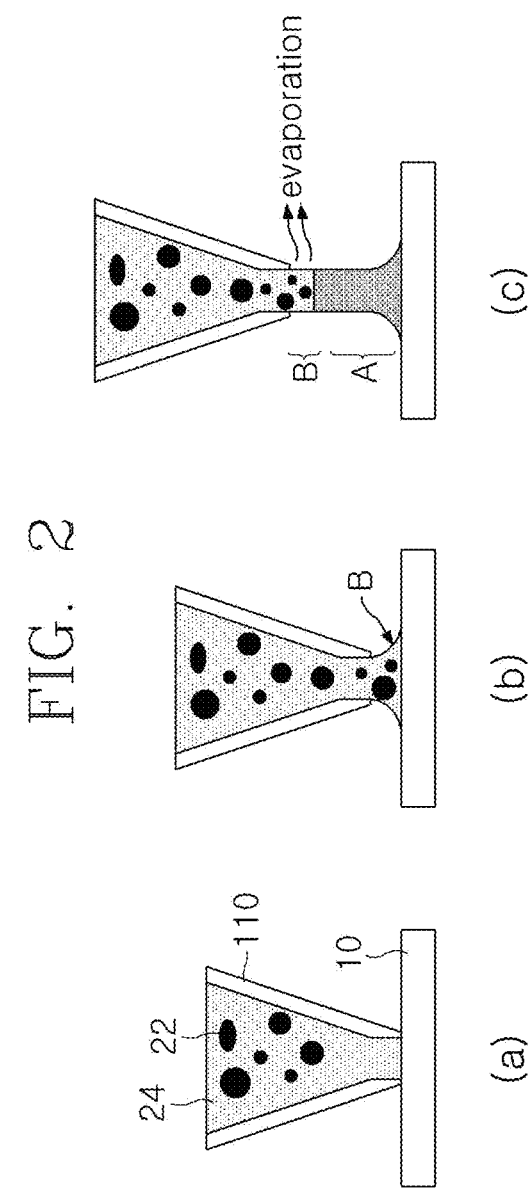

(a) to (c) of FIG. 2 is a concept diagram illustrating an operation process of a printing pen 110 in the meniscus-guided printing technique of the present invention in more detail.

Figure 3:
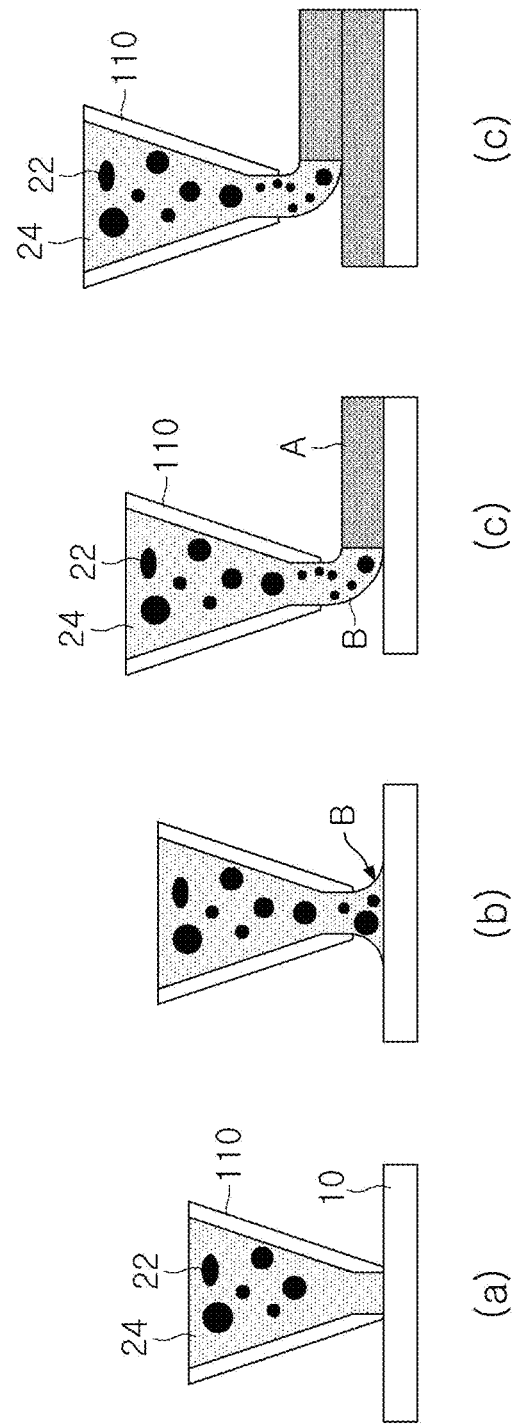

FIG. 3 is a diagram illustrating another example of a pattern printing method according to the present invention.

Figure 4:
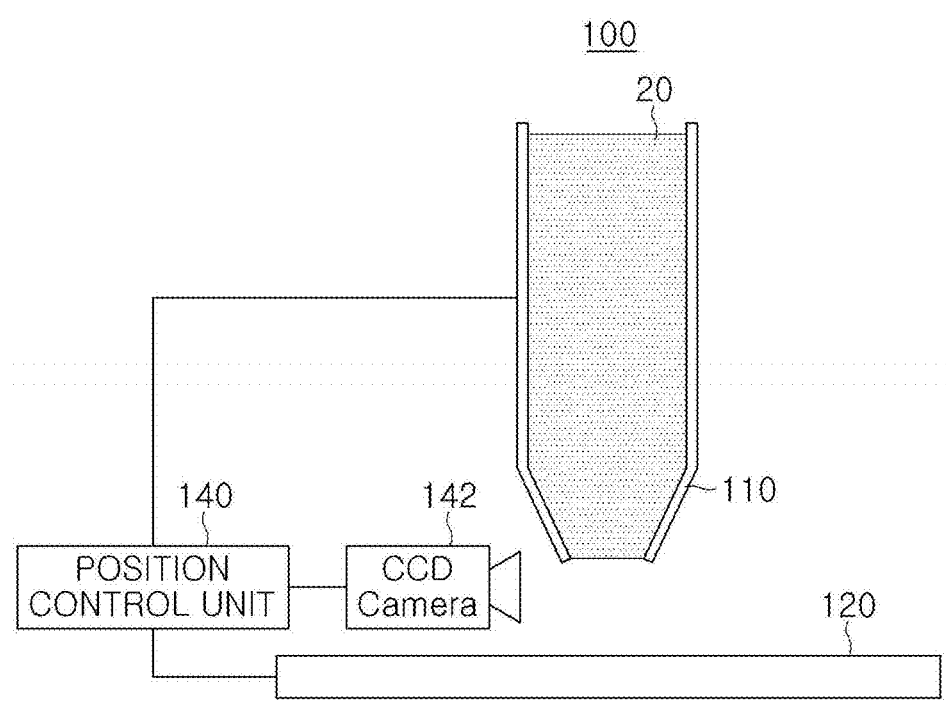

FIG. 4 is a diagram schematically illustrating a silver ink printing device according to another exemplary embodiment of the present invention.

Figure 5:
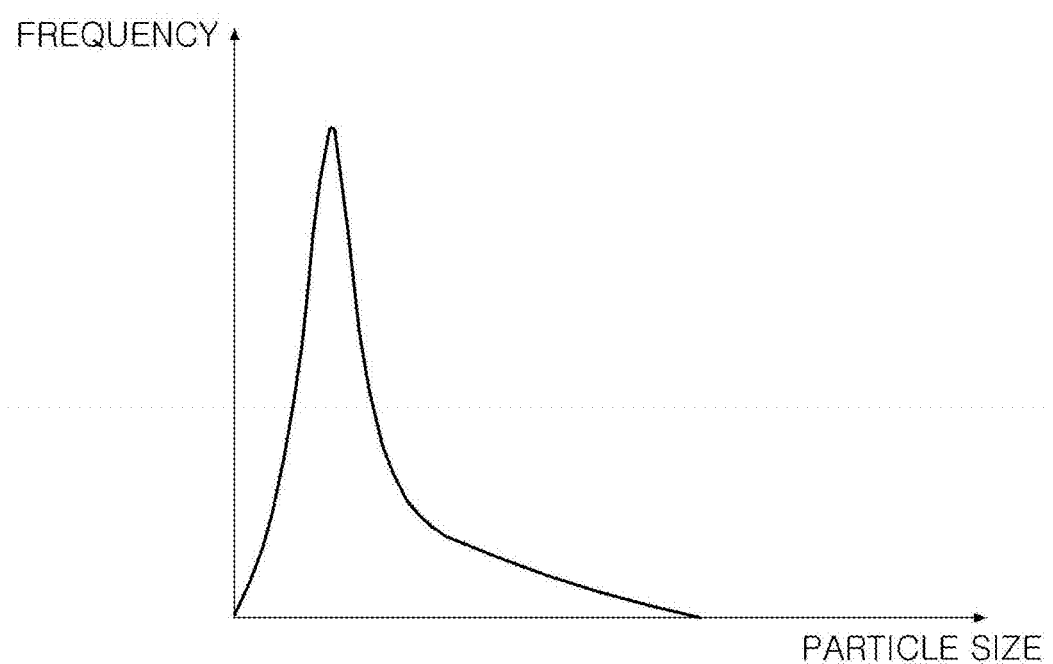

FIG. 5 is a diagram schematically illustrating an example of a preferred grain size distribution of silver particles in the present invention.

FIG. 6 is a graph illustrating a grain size analysis result of silver particles manufactured in the exemplary embodiment of the present invention.

Figure 7:
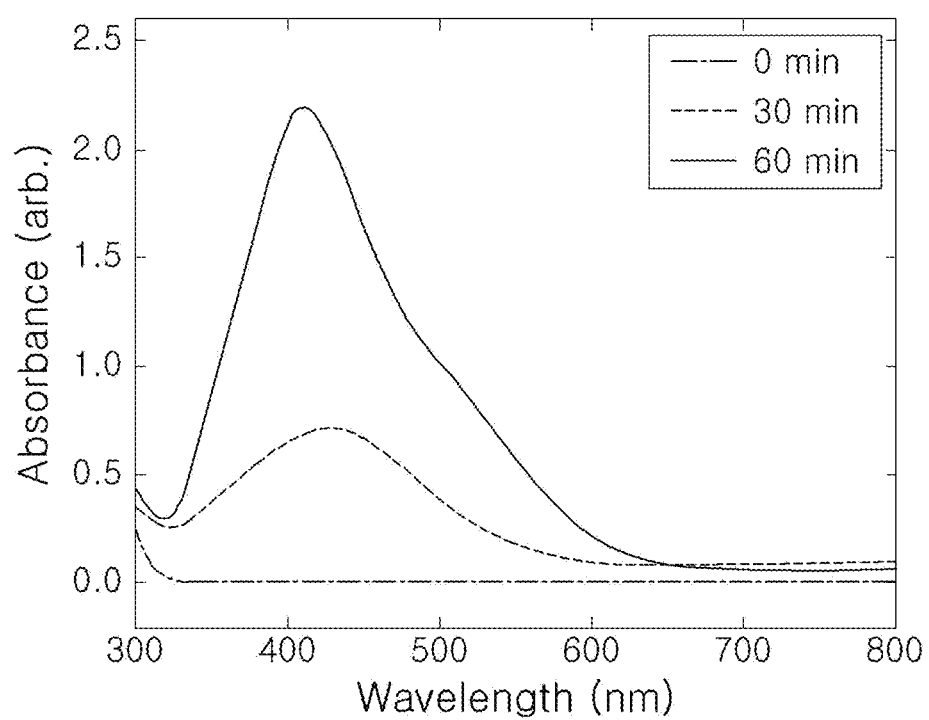

FIG. 7 is a graph illustrating an absorption spectrum analysis result for silver particles synthesized at different synthesis times according to the exemplary embodiment of the present invention.

Figure 8:
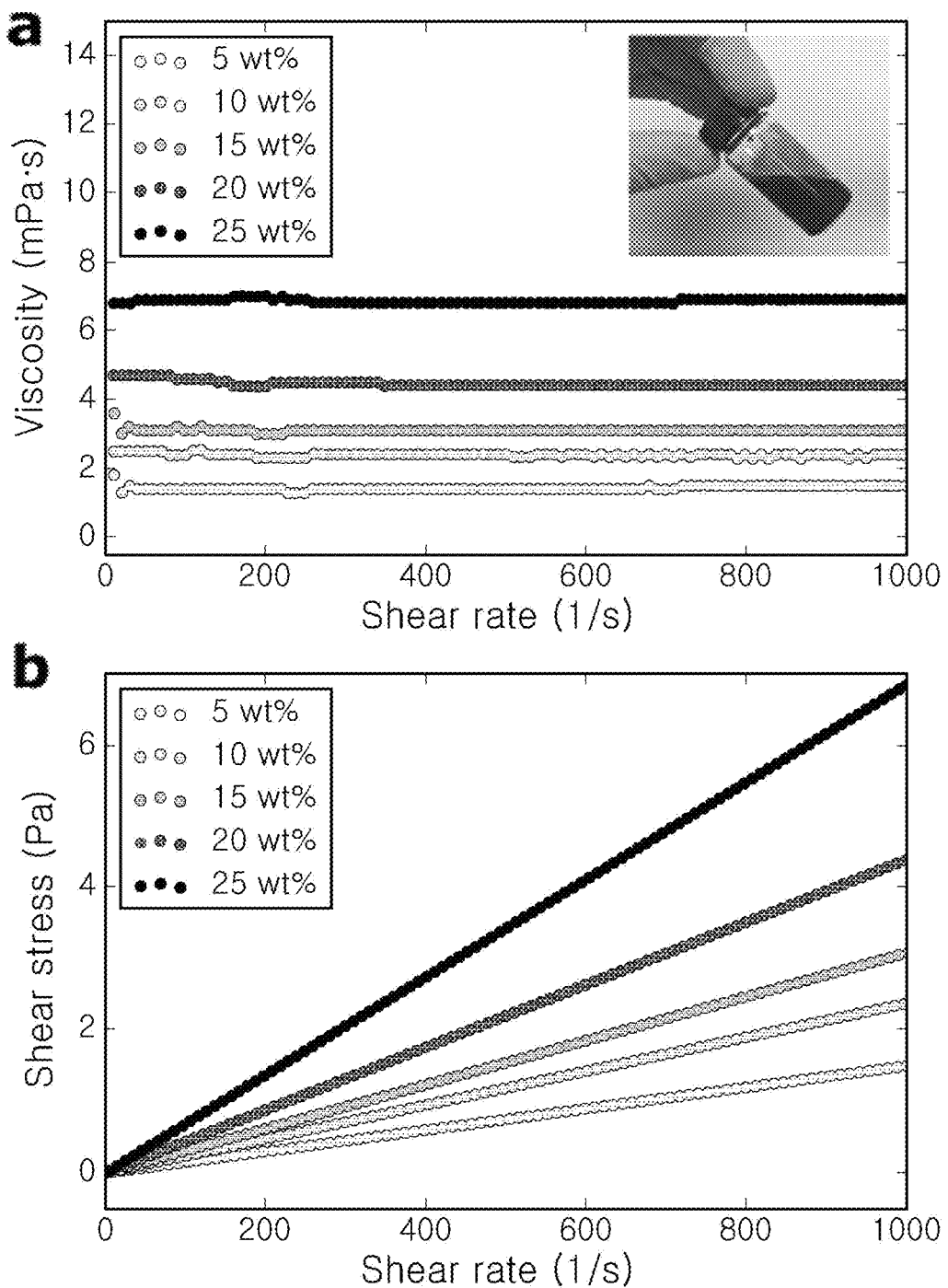

FIG. 8 is a graph illustrating a flow characteristic of silver ink manufactured in the exemplary embodiment of the present invention.

Figure 9:
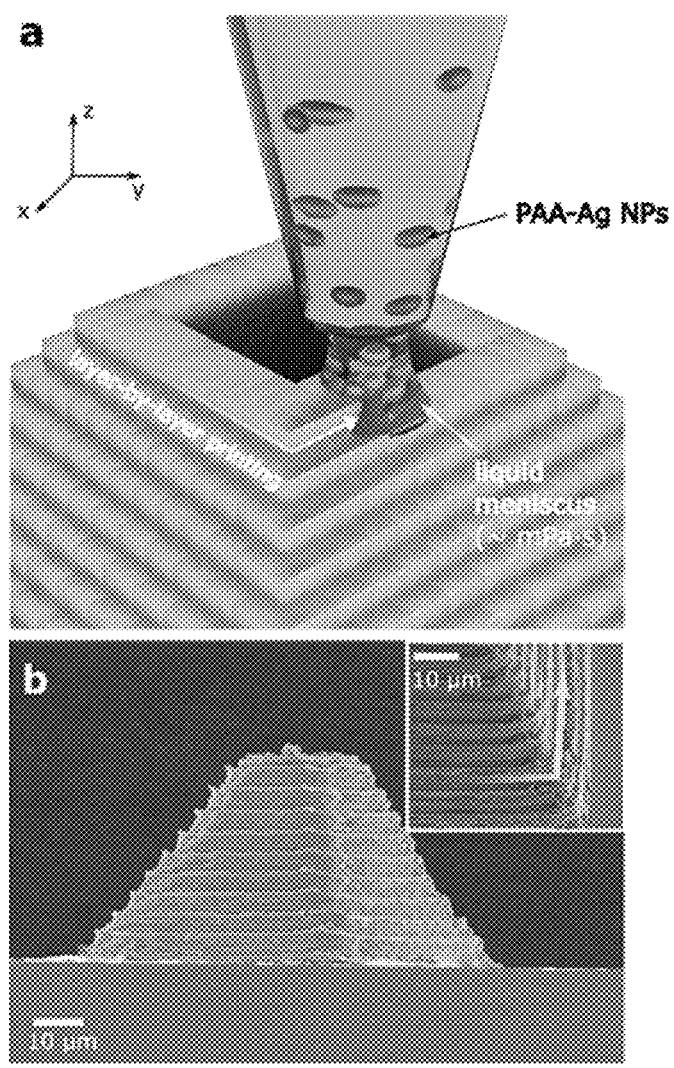

FIG. 9 is a diagram related to a pyramid structure manufactured as an exemplary embodiment of the present invention.

Figure 10:
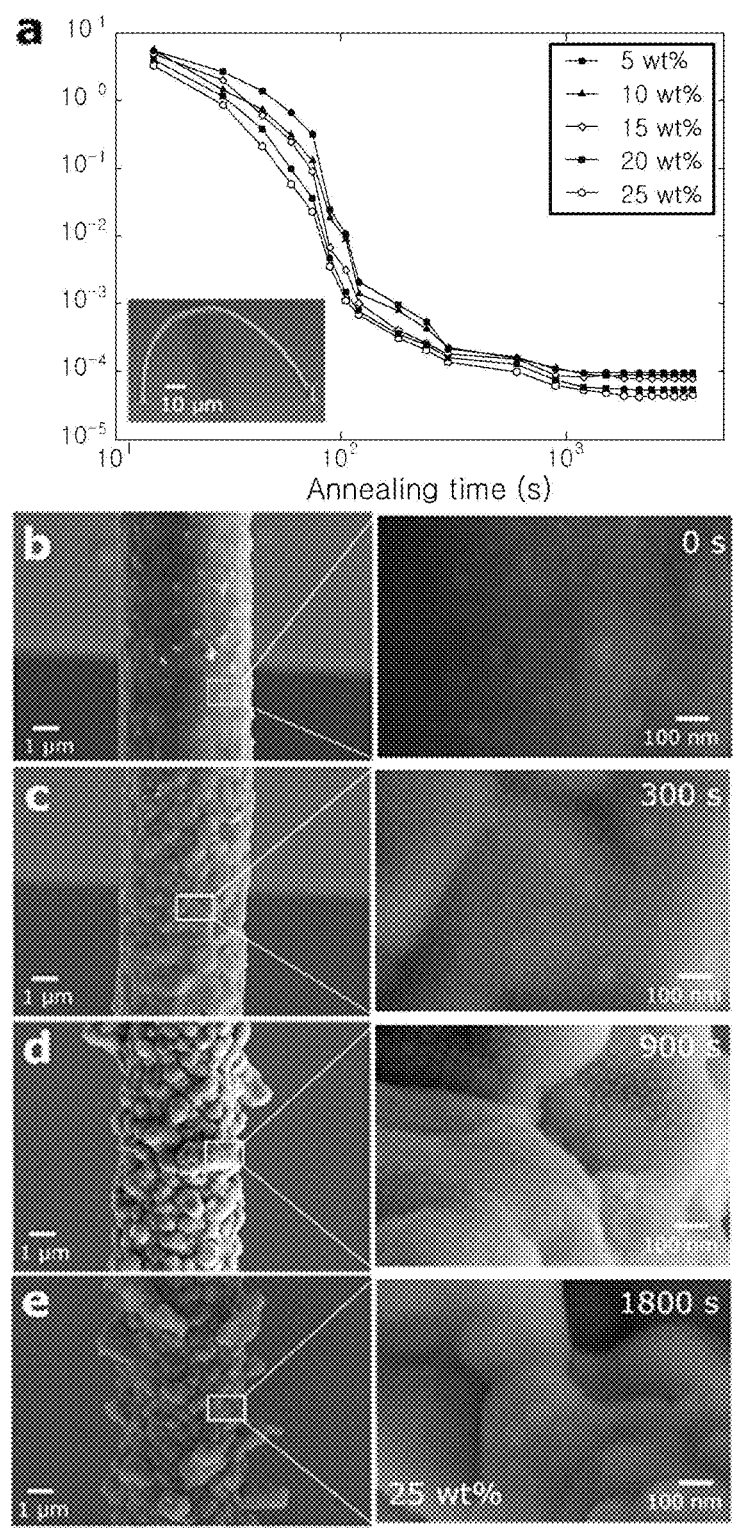

FIG. 10 is a graph illustrating an electrical conductivity measurement result of a microstructure of a bridge structure manufactured as an exemplary embodiment of the present invention.

Figure 11:
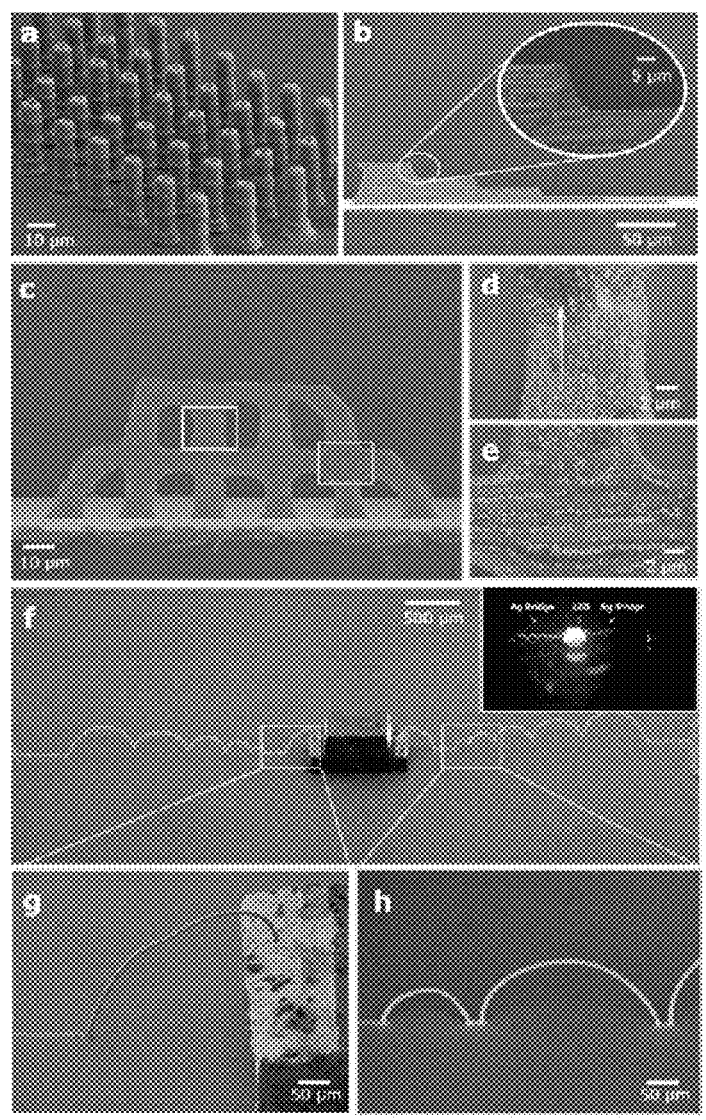

FIG. 11 is a picture of microstructures various forms manufactured in the present invention.

BEST MODE

Hereinafter, the present invention will be described by describing an exemplary embodiment of the present invention.

Figure 1:
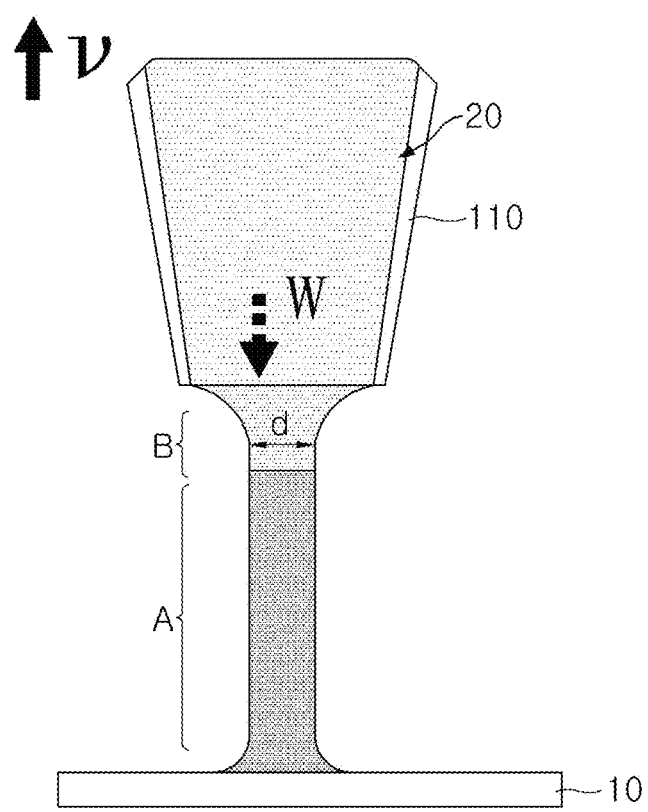
FIG. 1 is a diagram schematically illustrating a meniscus-guided printing technique of the present invention.

FIG. 1 is a diagram schematically illustrating a meniscus-guided printing technique of the present invention. Referring to FIG. 1, ink having high surface tension is maintained within a printing pen 110 provided with a nozzle. The printing pen 110 is in contact with a substrate 10 and the pen 110 moves in a specific direction, for example, a vertical direction, from a contact point at a predetermined speed v, so that the ink is discharged from a nozzle of a leading end of the pen with a predetermined flow amount W.

A meniscus B is formed by surface tension of the ink discharged in the vicinity of the nozzle of the leading end of the pen. A solvent of the ink is momentarily evaporated from a surface of the meniscus, and as a result, a stacked structure A is formed on the substrate. When the printing pen 110 moves in an upper direction, the surface tension of the meniscus B formed at the leading end of the nozzle acts in a direction of minimizing a surface area of the ink and pulls the ink within the nozzle, so that the ink is extruded to the outside of the nozzle without interruption. According to the movement of the nozzle in the predetermined direction, a continuous process in which the surface tension of the meniscus pulls the solution within the nozzle, so that the solution within the nozzle is continuously discharged, the stacked structure A is printed in an evaporation region close to the substrate, and the meniscus B is formed at the nozzle side occurs. As a result, a stacked structure pattern corresponding to a movement trace of the nozzle may be printed on the substrate. In the process, other external energy, other than weight of the ink, is not applied for discharging the ink.

(a) to (c) of FIG. 2 is a concept diagram illustrating an operation process of the printing pen 110 in the meniscus-guided printing technique of the present invention in more detail.

(a) of FIG. 2 illustrates an initial state, in which the nozzle of the pen 110 is in contact with the substrate 10. The ink formed of silver particles 22 and a solvent 24 for dispersing the silver particles is stored inside the pen 110.

When the pen 110 moves in the upper direction by a predetermined distance from the state of (a) of FIG. 2, the meniscus B of the ink is formed in a gap between the nozzle and the substrate.

In this state, when the pen 110 is pulled in the upper direction at a predetermined speed, the surface tension of the ink provides high attractive force between solvent molecules to decrease a surface area of the ink. Accordingly, the ink is extruded from the nozzle. By the method described in relation to FIG. 1, the meniscus B is formed by the surface tension of the ink at the nozzle side, so that the ink is extruded without interruption, and the stacked structure A of the silver particles 22 is formed at the substrate side by the evaporation of the solvent 24. In the present invention, the solvent of the meniscus B has a high specific surface area, so that the solvent spontaneously evaporates even at a room temperature. As a matter of course, the present invention does not exclude an addition of an appropriate heating means to the operation process of the pen depending on the case. In the present invention, the forming of the meniscus and the evaporation of the solvent are almost simultaneously generated, and a pattern including silver is left within a very short time.

In the present invention, a width of the meniscus may be maintained within an appropriate range so as to provide a higher specific surface area for the evaporation of the solvent. In the present invention, the width of the meniscus depends on an aperture of the nozzle and a movement speed of the nozzle. Further, the silver particles are guided and flow within the meniscus acting like a duct line, so that a resultant line width of the printed pattern has a value identical to or smaller than that of the width d of the meniscus.

Referring back to FIG. 1, the meniscus has the width d having a predetermined size at a predetermined movement speed v. However, when the movement speed is increased, the width of the meniscus has a smaller value. The relationship may be expressed by an equation below, which is called a so-called material balance law.

$$r = [W(v)/(\pi v)]^{1/2}$$

(Herein, r is a radius of the meniscus, v is a movement speed of the nozzle, and W is a flow speed of the ink).

In the meantime, a silver particle pattern printing technique of the present invention is applicable to various forms of pattern.

FIG. 3 is a diagram illustrating another example of a pattern printing method according to the present invention. Referring to (a) to (c) of FIG. 3, the printing pen 110 may move in a direction parallel to the substrate. Even in this case, the local forming of the meniscus, the movement of the printing pen, the discharge of the ink by pulling the printing pen, the evaporation of the ink solution, and the forming of the structure pattern are progressed by the same scheme as the foregoing scheme. Further, as illustrated in (d) of FIG. 3, the 3D structure pattern may be formed by stacking a 2D pattern in an upper direction by the same scheme.

As described with reference to FIGS. 2 and 3, it is possible to manufacture a freestanding wire pattern in a vertical direction to the substrate by moving the printing pen 110 in the vertical direction to the substrate, and a stacked structure pattern, such as a 3D bridge or wire bonding, may be formed by combining the movement directions of the printing pen in the direction vertical to the substrate and the direction parallel to the substrate.

FIG. 4 is a diagram schematically illustrating a silver ink printing device according to another exemplary embodiment of the present invention.

Referring to FIG. 4, the silver ink printing device 100 of the present invention may include the printing pen 110, a substrate stage 120, and a position control unit 140.

The printing pen 110 is provided with a loading space in which silver ink 20 is stored therein, and discharges the silver ink 20 through the nozzle provided in the leading portion. In the present invention, a cross-section of the nozzle of the printing pen 110 may have various forms, such as a circular shape, a quadrangular shape, and a hexagonal shape.

In the present invention, the nozzle has a predetermined aperture. As described above, a line width of the pattern printed by the movement of the nozzle depends on a movement speed of the nozzle. Preferably, an aperture of the nozzle in the present invention may be 0.1 μm to 50 μm. When the aperture of the nozzle is 50 μm or more, a specific surface area of the formed meniscus is small, so that it is not easy to print a stacked structure. Further, when the aperture of the nozzle is less than 0.1 μm, the nozzle may be clogged.

An ink supply tank (not illustrated) and an ink supply valve (not illustrated) may be connected to the printing pen 110. The ink supply valve may control a flow of the ink flowing into the printing pen 110. Further, the printing pen 110 may be attached to a feeding mechanism, for example, a feeding arm, for feeding the printing pen in the three axial directions, and the feeding arm may feed the printing pen 110 in the directions of X, Y, and Z axes.

The substrate stage 110 may be provided with all of the means for maintaining a substrate, which is a target to be printed. The substrate stage 120 may be provided with a feeding mechanism (not illustrated) movable in the three axial directions.

Further, the position control unit 140 controls a position of at least one of the printing pen 110 and the substrate stage 120. To this end, a driving mechanism, such as a stepping motor, feeds the printing pen 110 and the substrate stage 120 to control 3D relative positions of the printing pen 110 and the substrate stage 120.

Further, the position control unit 140 controls a relative movement speed of the printing pen 110 to the substrate. In the present invention, a movement speed (pulling speed) of the nozzle for printing a pattern is designed in consideration of a solution evaporation speed within the meniscus and surface tension of the solution. Water provides high surface tension, so that water is a solvent appropriate to the present invention, and a solvent, such as ethanol or acetone, other than water, is also usable. In the present invention, when water, ethanol, or acetone is used as a solvent, a movement speed of the nozzle may be within the range of 0.1 μm/sec to 200 μm/sec. At the movement speed of less than 0.1 μm/sec, the nozzle is clogged due to the rapid evaporation, and at the movement speed of 200 μm/sec or more, the pattern is cut.

As a matter of course, in the present invention, the position control unit 120 may also control a position of the printing pen 110 and/or a substrate stage 120 by referring to a shape of a unit structure obtained through a Charge-Coupled Device (CCD) camera 142. In this case, the position control unit 140 may also adjust a grow direction of the structure by controlling a shape of the meniscus 113 formed between the printing pen 110 and the substrate stage 120.

In the present invention, silver ink supplied as a raw material of the silver ink printing device 100 may have the characteristics below.

In the present invention, the silver ink includes silver particles, a capping agent for dispersing the silver particles, and a solvent.

In the present invention, the capping agent provides a functional group, such as SH, COOH, and NH, in order to be adsorbed to a silver particle surface to provide a stable dispersion characteristic of silver particles.

In the present invention, the capping agent may include one kind of polymer selected from the group consisting of poly acrylic acid (PAA), carboxylmethyl cellulose, polyvinylpyrrolidone (PVP), alkyl amine (long-chain), polyethylene glycol (PEG), and polyvinyl alcohol (PVA). In the present invention, the capping agent, of which a molecular weight is 50,000 or more, may be used.

In the present invention, a concentration of Ag particles, to which the capping agent is adsorbed, in the ink solution is 5 to 35 wt %. More preferably, a concentration of Ag particles in the ink solution is 10 to 35 wt %. At the concentration of 35 wt % or more, the Ag particles exhibit non-Newtonian fluid behavior.

In the present invention, the silver ink exhibits Newtonian fluid behavior having a linear relationship between shear stress and shear strain. Accordingly, viscosity of the silver ink is not changed according to force applied to a fluid. Accordingly, there is no change in a flow characteristic of the ink inside the nozzle or a narrow flow path of the nozzle opening, and there is no concern in the clogging of the nozzle. In the meantime, the ink exhibiting the visco-elastic fluid behavior causes the clogging of the nozzle without separate pressurization to make it difficult to continuously discharge the ink and print the structure.

In the present invention, the silver ink may have viscosity of 2 to 100 mPa·s. The ink having low viscosity exhibits a good behavior characteristic, but several times of repeated operation are required for printing the structure pattern due to the low silver concentration. Further, an increase in viscosity of the ink is advantageous to decrease the number of times of printing the pattern of the structure, but causes a change in the flow characteristic of the ink. Preferably, the silver ink may have viscosity of 5~ to 20 mPa·s, and more preferably, 5 to 10 mPa·s.

Further, the solvent of the silver ink of the present invention may be one kind of polar solvent selected from the group consisting of water, alcohol, and acetone. The polar solvent generally has high surface tension, and the high surface tension allows the ink to be continuously discharged without an interruption while the nozzle moves.

In the present invention, the silver particle dispersed in the ink has a nano size of less than 1 μm. In the present invention, the silver particles within the ink may have a mixture of fine particles and coarse particles, rather than having a uniform grain size close to a mono size. More preferably, the silver particles may have a low average grain size, but have a grain size distribution having a considerable fraction of coarse particles.

FIG. 5 is a diagram illustrating an example of a preferred grain size distribution of silver particles in the present invention. As illustrated, a grain size distribution of the silver particles is preferably gently lowered from the right tail than the left tail of the graph based on the maximum frequency peak in the grain size distribution graph measured by a laser grain size analyzer. For example, a cumulative distribution of the silver particles of which an average grain size is less than 8.4 nm and 30 nm or more may be 10% or more. The coexistence of the coarse particles and the fine particles is advantageous to form the stacked structure pattern having a high density.

MODE FOR CARRYING OUT THE INVENTION

Hereinafter, illustrative Examples of the present invention will be described.

<Synthesize Silver Nano Particles>

An aqueous solution, in which PAA having molecular weight of 50,000 is melted in the amount of 0.025 g (concentration of PAA is 25 wt %), was mixed with a solution obtained by melting diethanolamine (DE)A of 2 g in water of 2.5 mL, and the mixture was stirred for two hours at a room temperature. Here, an aqueous solution obtained by melting of $AgNo_3$ of 1 g in water (distilled water) of 1 ml was added.

The prepared mixed solution was microwave heated and synthesized by using the CEM Discover system of 2.45 GHz of the CEM company. Silver nano particles were manufactured under the microwave processing condition that a synthesis temperature is 75° C. and synthesis times are 30 minutes and 60 minutes.

50 ml of the synthesized silver nano particles were titrated with ethanol, and centrifuged in a centrifuge. The condensed silver particles were dried at a temperature of 40° C. for eight hours to remove ethanol and the solvent. A UV-vis absorption spectrum was measured with a spectrophotometer (Agilent Cary 5000, Agilent Tech.). Further, a shape of the manufactured particle was observed with TEM (JEM-2000FXII, JEOL Ltd.), and sizes of the synthesized silver particles were analyzed by using 200 specimens.

FIG. 6 is a graph illustrating a grain size analysis result of the manufactured silver particle. (a) of FIG. 6 is a graph representing the result of the synthesis for 30 minutes at the synthesis temperature, and (b) of FIG. 6 is a graph representing the result of the synthesis for 60 minutes at the synthesis temperature. As illustrated in (a) of FIG. 6, it can be seen that in the case of the synthesis for 30 minutes, the silver particles are formed of the particles mostly having a uniform size of less than 20 nm, but according to the increase in the synthesis time to 60 minutes, the coarse particles having a size of 30 nm or more are present with a high fraction.

In the case of the synthesis for 30 minutes, an average grain size was 8.4 nm, but in the case of the synthesis for 60 minutes, an average grain size was 12.9 nm. Further, in the graph, the y-axis is the percentage of a sample of 200 particles.

FIG. 7 is a graph illustrating an absorption spectrum analysis result for silver particles synthesized at different synthesis times.

Referring to FIG. 7, as the reaction time increases 30 minutes to 60 minutes, the intensity of the absorption spectrum increases, a maximum peak position is transited from 420 nm to 408 nm, and a shoulder peak is observed in the vicinity of about 490 nm. This shows the Ostwald ripening mechanism, which consumes small particles and increases the number of coarse particles.

<Manufacture of Silver Ink>

The synthesized silver nano particles were dispersed in distilled water to have concentrations of 5, 10, 15, 20, 25 wt % to manufacture ink. The viscosity of the ink was measured by using the corn-and-plate rheometer (MCR102, Anton Paar) at a shear rate of $10^1$ to $10^3 \cdot s^{-1}$.

FIG. 8 is a graph illustrating a flow characteristic of the manufactured silver ink.

As can be seen from (a) of FIG. 8, the viscosity increases according to the concentration of the silver particles, and the viscosity increases from about 1.4 to 6.8 mPa·s while the concentration increases from 5 wt % to 25 wt %. Further, as can be seen from (b) of FIG. 8, the Ag ink exhibits the Newtonian fluid behavior in which shear stress and a shear rate are linearly proportional to each other in the concentration range of 5 to 25 wt %.

Although not separately illustrated, it was checked that the Ag ink exhibited the non-Newtonian fluid behavior at the concentration of 35 wt % or more, and shear stress and a shear rate have a non-linear relationship.

<Manufacture 3D Structure>

3D silver micro structures having various shapes were manufactured by using a glass micronozzle, in which an opening diameter of a tip of the nozzle is 5 to 15 μm, and the P-97 nozzle puller of the Sutter Instrument Co. The micro nozzle was filled with the manufactured ink by capillary force or external pressure, and then the ink was discharged from the tip of the nozzle through a meniscus generated by surface tension.

A position and a pulling speed of the micro nozzle were precisely controlled with position preciseness of about 250 nm by a three-axis stepping motor. The manufactured micro structure was annealed in the air at a temperature of 250° C.

The manufactured structure was observed with S-4800 FE-SEM of Hitachi, Ltd. Electrical conductivity of the silver micro structure was measured by a two-point probe method using a Kesley 2612A instrument at a room temperature.

FIG. 9 is a diagram related to a pyramid structure manufactured in the present invention. (a) of FIG. 9 is a diagram schematically illustrating a process of manufacturing a pyramid structure, and (b) of FIG. 9 is an electron microscope picture of the manufactured pyramid structure.

(a) of FIG. 10 is a graph illustrating a result of a measurement of electrical conductivity of a microstructure of a bridge structure manufactured in the present invention.

As illustrated, it is shown that each of the microstructure bridges manufactured with ink of different concentrations of 5 to 25 wt % has decreasing resistance according to an increase in annealing time (0 minute, 5 minutes, 15 minutes, and 30 minutes). In the case where the bridge manufactured with the ink having the concentration of 25 wt % is annealed for 30 minutes, the resistance decreases from 100 to less than $10^{-4}$ Ω·cm. Although not illustrated, it can be seen that in the case where the bridge manufactured with the ink having the concentration of 25 wt % is annealed for 1 hour, the bridge represents a specific resistance value of $4.14 \times 10^{-5}$ Ω·cm, and this shows good conductivity corresponding to ¼ of a specific resistance value ($1.56 \times 10^{-5}$ Ω·cm) of bulk silver.

a to h of FIG. 11 is a picture of microstructures in various forms manufactured in the present invention.

In FIG. 11, a is a picture of an arrangement of freestanding silver wires each of which has a diameter of 8 μm, b is a picture of a 5-stage stair structure, c to e are pictures of Colosseum structures, d and e are enlarged pictures of the parts of c, and f to h are pictures of 3D micro interconnect structures as switches of an LED lamp.

In the above, the present invention has been described through the exemplary embodiment of the present invention, but the foregoing description illustrates the present invention, and the present invention is not limited thereto. The ranges, in which those skilled in the art can variously change and carry out the present invention in the field to which the present invention belongs without departing from the accompanying claims and the subject matter of the present invention, shall be considered to belong to the scope of the present invention.

INDUSTRIAL APPLICABILITY

The present invention is applicable to a 3D printing and printed electronics technology.

The invention claimed is:

1. A method of printing a three-dimensional (3D) silver structure pattern with a printing pen including a nozzle, the method comprising:
   providing the nozzle with liquid ink including capped silver nanoparticles and exhibiting Newtonian fluid behavior;
   forming, at a predetermined point on a substrate, a meniscus of the liquid ink between the substrate and the nozzle with ink extruded from the nozzle;
   allowing the ink of the nozzle to be extruded by means of surface tension of the meniscus while moving the nozzle along a path in a direction vertical to the substrate, in a direction parallel to the substrate, or according to a combination of the directions; and
   forming a silver structure pattern corresponding to the movement path of the nozzle by evaporating a solvent in the extruded ink from the region closer to the substrate.

2. The method of claim 1, wherein the solvent is a minimum of one kind selected from the polar solvent group consisting of water, alcohol, acetone, and dichloromethane.

3. The method of claim 2, wherein a concentration of the silver nano particles is 5 to 35 wt %.

4. The method of claim 2, wherein a line width of the pattern is controlled by a movement speed of the nozzle.

5. The method of claim 4, wherein the movement speed of the nozzle is 0.1 µm/sec to 200 µm/sec.

6. The method of claim 1, wherein an aperture of the nozzle is 0.1 to 50 µm.

7. The method of claim 1, wherein the ink includes a minimum of one kind of polymer selected from the group consisting of poly acrylic acid (PAA), carboxylmethyl cellulose, polyvinylpyrrolidone (PVP), alkyl amine, polyethylene glycol (PEG), and polyvinyl alcohol (PVA) as a capping agent.

8. The method of claim 7, wherein the capping agent has molecular weight of 50,000 or more.

9. The method of claim 1, wherein viscosity of the ink is 2 mPa·s to 100 mPa·s.

10. The method of claim 9, wherein a concentration of silver particles within the ink is 10 to 35 wt %.

11. The method of claim 1, wherein in the ink, a cumulative distribution of the silver particles of which grain size is 30 nm or more is 10% or more.

12. The method of claim 1, wherein an average grain size of the ink is less than 15 nm.

* * * * *